(12) United States Patent
Hisanaga

(10) Patent No.: US 6,340,236 B1
(45) Date of Patent: Jan. 22, 2002

(54) HOT MELT ADHESIVE COMPOSITION

(75) Inventor: Takashi Hisanaga, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/558,156

(22) Filed: Apr. 26, 2000

(30) Foreign Application Priority Data

Apr. 28, 1999 (JP) ............................................. 11-121239

(51) Int. Cl.[7] ................................................. F21V 29/00
(52) U.S. Cl. ........................ 362/267; 362/546; 156/108; 524/474
(58) Field of Search ................................ 362/520, 546, 362/267; 156/108, 325, 338; 526/290; 524/474

(56) References Cited

U.S. PATENT DOCUMENTS

| | | | |
|---|---|---|---|
| 3,625,796 A | * 12/1971 | Graves | 362/546 |
| 5,516,390 A | * 5/1996 | Tomita et al. | 156/108 |
| 6,143,818 A | * 11/2000 | Wang et al. | 524/474 X |

* cited by examiner

*Primary Examiner*—Stephen Husar
(74) *Attorney, Agent, or Firm*—Finnegan, Henderson, Farabow, Garrett & Dunner, L.L.P.

(57) ABSTRACT

A hot melt adhesive is provided with which foams are not remained at an adhered interface when a molded product of a polycarbonate resin, an acrylic resin or the like is adhered in an atmosphere of 80° C. or higher. The adhesive is obtained by blending calcium oxide with a hot melt adhesive containing rubber, amorphous polyolefin and a resinous tackifier.

14 Claims, 1 Drawing Sheet

HOT MELT ADHESIVE COMPOSITION

BACKGROUND OF THE INVENTION

1. Field of the Invention

The present invention relates to a hot melt adhesive composition suitable for bonding and sealing between polycarbonate resins or acrylic resins, or between polycarbonate resins or acrylic resins and other materials in manufacturing lamps such as headlamps in automobiles, lighting, electronics parts, signals, etc., or in glazing side windows of automobiles and other windows. Particularly, the invention relates to a hot melt adhesive composition in which a staying phenomenon of foams at an adhered interface does not take place while maintaining adhesive force for a long period even if an adhered material is placed in an atmosphere of 80° C. or higher after bonding.

2. Description of the Related Art

Polycarbonate resins have extremely high mechanical strength such as impact strength, thermal stability, superior electric properties, superior weatherability, and high transparency. Also, polycarbonate resins can be colored at will and are superior in size stability. For that reason, polycarbonate resins are used widely in machine parts, electric parts, electronic parts, lighting parts, household articles, etc.

For bonding or sealing of such polycarbonate resins, there has been employed a method in which a so-called hot melt adhesive such as ethylenevinyl acetate copolymer type or rubber type adhesives or sealing agent is introduced in an applicator and then melted, and the molten adhesive is applied to a polycarbonate resinous products to bond the resinous products together while the adhesive maintains stickiness.

However, when bonding or sealing of polycarbonate resins or bonding of the resins to other materials is carried out by using those conventional hot melt adhesives and thereafter the adhered product is heated at a temperature equal to or above 70° C., low molecular weight compounds such as water and carbon dioxide are produced from the polycarbonate resin, which stay as foams at the interface between the polycarbonate resin and the hot melt adhesives, causing decrease in adhesive force or sealing force of the adhesives. Similar phenomena are observed in the cases of acrylic resins.

For that reason, hot melt adhesives through which foams of low molecular weight compounds such as water and carbon dioxide can be easily passed have been developed, but their blocking effects against staying foams are not sufficient. In practice, the adhesives are used for bonding or sealing after polycarbonate resins or acrylic resins are heated and dried previously to remove the above-mentioned low molecular weight compounds. It is desired, however, to avoid the previous heating and drying steps and decrease costs of equipment and processing.

SUMMARY OF THE INVENTION

In view of the above, the present inventors have proposed adhesive compositions for preventing foams to stay at the interface by blending a terpenebisphenol A copolymer as a tackifier with rubber (Japanese Patent Nos. 2763076 and 2779024). These adhesive compositions do have effects to a certain extent, but recently there are some cases requiring thermal resistance against a temperature equal to or above 80° C. Therefore, an object of the present invention is to provide a hot melt adhesive composition with which no foam is remained at an adhered interface between a polycarbonate resin or an acrylic resin and the hot melt adhesive even if an adhered material is placed in an atmosphere of 80° C. or higher after bonding without any decrease in adhesive force or sealing force of the adhesive.

The present invention directs the attention to water absorbability and carbon dioxide absorbability of calcium oxide to solve the above-mentioned problem.

That is, according to the present invention, there is provided a hot melt adhesive composition characterized in that 2–30 parts by mass of calcium oxide is blended with 100 parts by mass of a hot melt adhesive composition containing rubber, amorphous polyolefin and a resinous tackifier.

The hot melt adhesive composition according to the present invention preferably contains butyl rubber and a styrenediene type block copolymer as rubber components.

For the hot melt adhesive composition according to the present invention, a mass ratio of the styrenediene type block copolymer contained in the rubber components is preferably 5–40%.

For the hot melt adhesive composition according to the present invention, it is preferable to blend 25–100 parts by mass of amorphous polyolefin with 100 parts by mass of rubber.

For the hot melt adhesive composition according to the present invention, it is preferable to blend 50–200 parts by mass of a resinous tackifier with 100 parts by mass of rubber.

For the hot melt adhesive composition according to the present invention, the resinous tackifier is, preferably, at least one kind of resin selected from the group consisting of petroleum resins, terpene resins, modified products of these resins and hydrogenates of these resins.

For the hot melt adhesive composition according to the present invention, a mass ratio of the petroleum resins to the terpene type resins (terpene resin, modified terpene resin and hydrogenated terpene resins) is preferably 50/50–95/5.

The hot melt adhesive composition according to the present invention is preferably used for bonding with a polycarbonate resin or an acrylic resin.

The hot melt adhesive composition according to the present invention is preferably used for sealing between a lens of an automobile lamp made of a polycarbonate resin or an acrylic resin and a housing thereof.

Further, the present invention comprises an automobile lamp in which sealing is made between a lens made of a polycarbonate resin or an acrylic resin and a housing by using any one of the hot melt adhesive compositions stated above.

DETAILED DESCRIPTION OF THE PREFERRED EMBODIMENTS

Figure 1:
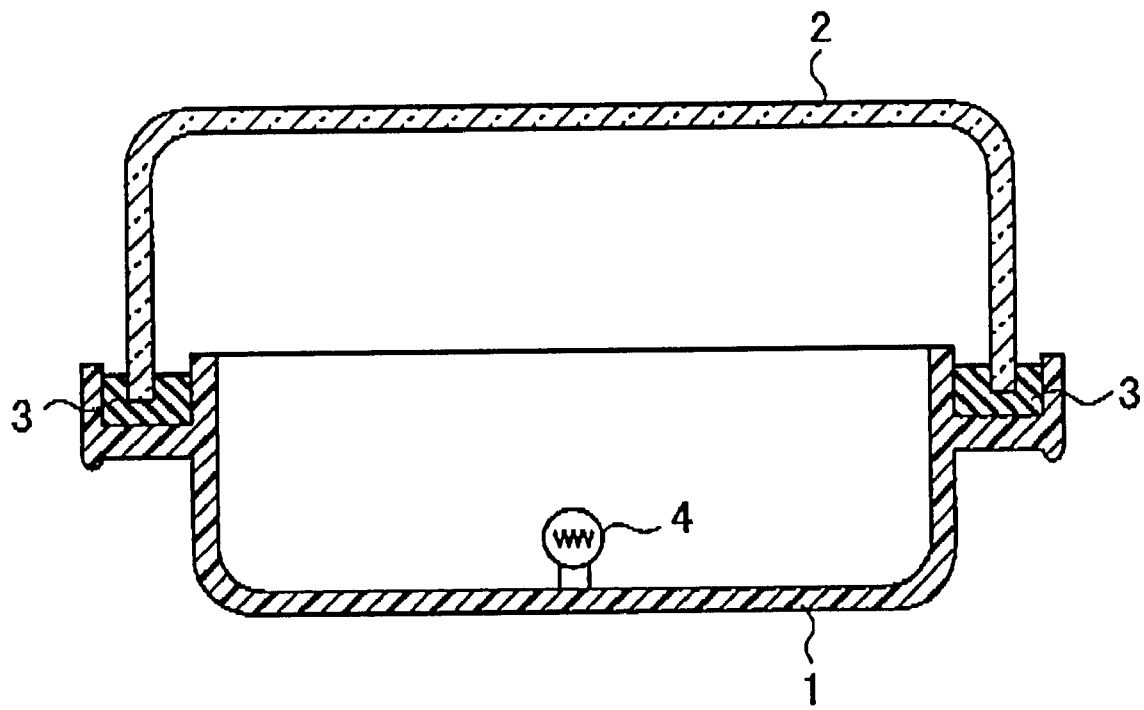
FIG. 1 shows a conventional automobile lamp to which a hot melt adhesive has been applied.

A hot melt adhesive composition according to the present invention contains rubber and amorphous polyolefin as base polymers, and it may further contain other polymers. The rubber to be contained in the composition is exemplified by olefin type rubbers such as butyl rubber and ethylenepropylene rubber (EPR) as well as styrenediene type rubbers such as styreneisoprene-styrene block copolymer rubber (SIS), styreneethylenebutylene block copolymer rubber (SEBS) and styreneethylenepropylene block copolymer rubber (SEPS). Of those, butyl rubber, SIS, SEBS and SEPS are preferable. Two or more of the above-mentioned rubbers may be used in admixture.

Since butyl rubber is superior in sealing property, weatherability, moisture resistance, thermal resistance, impact absorption, etc., it is suitable as a base polymer in a hot melt adhesive for bonding or sealing of automobile parts and the like. Used here is a popular one having a Mooney viscosity ($ML_{1+8}$, 100° C.) of 35–55 and a specific gravity of 0.91–0.93.

Styrene-diene type block copolymer rubbers are those which are rapidly soften and liquefied when heated at 100–150° C. since end blocking polystyrene units thereof have a melting point of about 100° C. and which, on the other hand, acquire tough rubbery elasticity when cooled. Further, since they express various characteristics according to the kind of elastomeric chains in intermediate blocks, they are suitable as base polymers in the hot melt adhesives for bonding or sealing of automobile parts and the like. As to SEBS, SIS and SEPS, popular ones having a melt flow rate (MFR: 200° C., load; 5.0 kg) of 5–100 are used.

In such cases that two or more kinds of rubbers are used, it is preferable to use a combination of butyl rubber and styrenediene type block copolymer rubber, or to use other rubbers in addition to the combination of butyl rubber and styrenediene type block copolymer rubber. In such cases, a mass ratio of styrenediene type block copolymer rubber in rubber components is preferably 5–40%, in particular, 15–30%.

The amorphous polyolefins to be used here is exemplified by atacticpolypropylene (APP), amorphous polyα-olefin (APAO), etc. Atacticpolypropylene (APP) is preferable.

The amorphous polyolefin is blended in an amount of 25–100 parts by mass per 100 parts by mass of rubber.

Other polymers which may be blended with the base polymers, i.e., rubber and amorphous polyolefin, are such polymers as an ethylenevinyl acetate copolymer, an ethyleneacrylic acid copolymer and low density polyethylene. Molecular weight and a composition ratio of these other polymers are not limited particularly and they may be within general ranges.

Mixing and preparation of the base polymers may be carried out by using only constitutional components (rubber and amorphous polyolefin) of the base polymers, but they may be carried out at the same time as mixing and preparation of the base polymers and other blending components such as the resinous tackifier.

Examples of the resinous tackifiers include rosin resins, terpene resins, alicyclic petroleum resins, aromatic petroleum resins, coumaroneindene resins as well as modified ones and hydrogenated ones thereof. The resinous tackifiers preferably contain terpene resins, modified terpene resins or hydrogenated terpene resins. Representative modified terpene resins are terpenephenol co-oligomers, i.e., oligomers obtained by copolymerizing terpene or a terpene derivative with various phenols.

The terpene derivatives are exemplified by terpene alcohol, terpene aldehyde, terpene ketone, etc. As the various phenols, phenol, cresol, xylenol, bisphenol A, etc., are listed. A particularly preferable modified terpene resin is terpenebisphenol A co-oligomer.

Two or more kinds of resinous tackifiers may be used together, for example, the terpenephenol copolymer is preferably used together with alicyclic petroleum resins or hydrogenated aromatic petroleum resins, in particular. In the case of using them together, no limitation is put to the blending ratio but a ratio by mass of terpene resin/petroleum resin is preferably 5/95–50/50, and it is preferable to blend 50–200 parts by mass of the resinous tackifier with 100 parts by mass of rubber.

Calcium oxide is white and amorphous, and it has a specific gravity of 3.2–3.4. Since calcium oxide is water absorptive and carbon dioxide absorptive, it may be available as particles mixed with a small amount of an oily agent or as a paste mixed with a considerable amount of an oily agent, with the proviso that those stored well are used. In the present invention, it is advisable to use particles owing to their good handling and operative properties. The shape, diameter and diameter distribution of particles are not particularly limited, and popular ones are used. Calcium oxide absorbs and adsorbs low molecular weight compounds to be converted into calcium hydroxide, calcium carbonate, etc., but these do not have an influence upon adhesion force or sealing force of the hot melt adhesive composition.

Calcium oxide is blended in an amount of 2–30 parts by mass with 100 parts by mass of the composition containing the base polymers and the resinous tackifier. If it is less than 2 parts by mass, absorption of foams stayed at the interface between a polycarbonate resin or an acrylic resin and the hot melt adhesive composition is not sufficient, and thus adhesive force or sealing force is not increased so much as expected. Further, if the calcium oxide content is above 30 parts by mass, adhesive force or sealing force between the polycarbonate resin or the acrylic resin and the hot melt adhesive is also insufficient. Further, a discharging amount from an applicator is not sufficient, and thus a pump of the applicator may be abraded. A blended amount thereof is preferably 2–20 parts by mass, in particular 3–10 parts by mass.

Waxes, fillers, plasticizers, anti-aging agents, etc., may be blended into the hot melt adhesive composition according to the present invention. The waxes to be used here are exemplified by paraffin wax, microcrystalline wax, low molecular weight polyethylene, low molecular weight polypropylene, Fisher-Tropsch wax, etc. Examples of the fillers include calcium carbonate, talc, white carbon, silica, carbon black, etc. Examples of the plasticizers include phthalate esters, glycol esters, hydrocarbon type plasticizers (polybutene, polyisobutylene, ethylenepropylene oligomer), etc. Usable anti-aging agents may be phenol type and amine type ones. Additionally, various antioxidants, ultra-violet ray absorbers and silane coupling agents may be blended.

The hot melt adhesive composition according to the invention may be generally prepared by adding constitutional components successively and mixing them, but various components may be blended simultaneously or in stepwise and then mixed. If necessary, heating or degasification may be carried out.

The hot melt adhesive composition according to the present invention may be used for plastics in general, but it is most effective when applied to plastic products such as polycarbonate resins and acrylic resins which produce gasses consisting of low molecular weight compounds upon heating or drying.

There is no particular limitation in means and conditions for application of the hot melt adhesive composition according to the present invention for plastic products such as polycarbonate resins and acrylic resins, that is, heating and melting of the adhesive composition, applying the adhesive composition to the plastic products, crosslinking curing of the applied adhesive composition and cooling of the cured products. In short, general means and conditions may be adopted.

Shapes, sizes and uses of the plastic products such as polycarbonate resins and acrylic resins to which the hot melt adhesive composition according to the invention is applied are not particularly limited. For example, in manufacturing an automobile illuminating lamp with a lens made of a polycarbonate resin or an acrylic resin, the hot melt adhesive composition according to the present invention may be used for bonding or sealing between the lens and a housing. Since foams derived from the resin do not stay in the thus obtained automobile illuminating lamp, adhesive force can be maintained for a long period, thereby improving the durability of the lamp.

An example of a conventional automobile illuminating lamp is shown in FIG. 1. The lamp includes a housing 1, a lens 2, an adhesive 3 and a light source 4.

The present invention will be described specifically based on the following Examples.

EXAMPLES 1–6 AND COMPARATIVE EXAMPLES 1–3

Rubbers, amorphous polyolefin, a resinous tackifier, calcium oxide and other blending agents described below were introduced successively into a kneader at blending ratios (on mass basis) shown in Table 1, heated at 190° C. to melt, and mixed for 3 hours. Thereafter, the mixture was cooled to obtain a hot melt adhesive composition.

Components of an Adhesive Composition butyl rubber: [PB-402] made by Bayer Ltd.
SEBS: [Kraton G-1652] made by Shell Kagaku Co. Ltd.
EPDM: [Mitsui EPT 0045] made by MITSUI CHEMICALS, INC.
APP: [Sunatac R] made by CHIBA FINE CHEMICAL Co., Ltd.
petroleum resin: [Escorez 1315] made by Tonex Co. Ltd.
Hydrogenated petroleum resin: [Arkon P-125] made by Arakawa Chemical Industries, Ltd.
terpene resin: [YS resin TO-125] made by Yasuhara Chemical Co. Ltd.
hydrogenated terpene resin: [Clearon P-125] made by Yasuhara Chemical Co. Ltd.
terpene-bisphenol A oligomer: [YS Polyster #2130] made by Yasuhara Chemical Co. Ltd.
polybutene: [Polybutene HV-100] made by NIPPON PETROCHEMICALS Co., Ltd.
silica: [Carplex 1120] made by Shionogi & Co., Ltd.
antioxidant: [IRGANOX 1010] made by CHIBA-GEIGY (JAPAN) LIMITED.
Calcium oxide: [CML-31] made by Omi Kagaku Co. Ltd.

The above-mentioned adhesive composition was applied to a laminate of a polycarbonate resinous sheet (PC sheet) and a polypropylene sheet (PP sheet) in accordance with the following procedures. Evaluation (as to foaming and adhesiveness) of the above-mentioned adhesive composition on the obtained laminate was carried out by the following method. Results are shown in Table 1.

(1) The adhesive composition was heated at 190° C. to melt and applied to a PP sheet (50 mm×50 mm×3 mm) by means of a hot shot gun. Immediately thereafter, a PC sheet (50 mm×50 mm×3 mm) was layered on the PP sheet and pressed to adjust the shape of the adhesive composition to have a diameter of about 30 mm and a thickness of 1 mm. The obtained laminate was cooled down to room temperature, and thereafter stood still under heated atmospheres (80° C., 100° C., 120° C.) for 3 hours, and a state of foams at the interface between the PC sheet and the adhesive composition layer was observed visually.

From the observed results, foaming properties thereof were evaluated as follows:

⊚: almost no foam stays (less than 2 foams per 1 $cm^2$)
○: a few foams are remained (about 2–9 foams per 1 $cm^2$)
Δ: a considerable number of foams are remained (about 10–20 foams per 1 $cm^2$)
X: a large number of foams are remained (more than 20 foams per 1 $cm^2$)

(2) The adhesiveness was evaluated by using the laminate after foams thereof had been observed. The adhesive composition layer of the laminate, which has a thickness of 1 mm, was forcedly stretched to 3 mm and left as it was at 20° C. for 3 days, and then an adhered state was observed visually.

⊚: adhesion is fully maintained
○: whitening takes place on the surface adhered with the PC sheet, but adhesion is almost fully maintained
Δ: destruction takes place at parts near the surface adhered with the PC sheet
X: destruction takes place on the surface adhered with the PC sheet (3) Further, melt viscosity of the adhesive composition was determined at 190° C. by using a Brookfield type viscometer. Values below 100 Pa·s are judged preferable (○) viewed in the light of a discharging property from an applicator.

TABLE 1

| | | CE 1 | CE 2 | EX 1 | EX 2 | EX 3 | EX 4 | EX 5 | EX 6 | CE 3 |
|---|---|---|---|---|---|---|---|---|---|---|
| Components of composition (parts by mass) | Butyl rubber | 50 | 50 | 50 | 50 | 50 | 50 | 50 | 50 | 50 |
| | EPDN | 50 | 50 | 50 | 50 | 50 | 50 | 50 | 50 | 50 |
| | SEBS | 40 | 40 | 40 | 40 | 40 | 40 | 40 | 40 | 40 |
| | APP | 80 | 80 | 80 | 80 | 80 | 80 | 80 | 80 | 80 |
| | Petroleum resin | 150 | 150 | 150 | 150 | 150 | 150 | 150 | 150 | 150 |
| | Hydrogenated petroleum resin | | | | | | | | | |
| | Terpene resin | | | | | | | | | |
| | Hydrogenated terpene resin | | | | | | | | | |
| | Modified terpene resin | 50 | 50 | 50 | 50 | 50 | 50 | 50 | 50 | 50 |
| | Polybutene | 60 | 60 | 60 | 60 | 60 | 60 | 60 | 60 | 60 |
| | Silica | 10 | 10 | 10 | 10 | 10 | 10 | 10 | 10 | 10 |
| | Antioxidant | 1 | 1 | 1 | 1 | 1 | 1 | 1 | 1 | 1 |
| | Calcium oxide | | 4.9 | 9.8 | 14.7 | 24.5 | 49 | 98 | 147 | 196 |
| | (Total) | 491 | 495.9 | 500.8 | 505.7 | 515.5 | 540 | 589 | 638 | 687 |
| Composition ratio | Calcium oxide/Adhesive composition | 0 | 1.0 | 2.0 | 3.0 | 5.0 | 10 | 20 | 29.9 | 39.9 |
| Evaluated results | Foaming property 80° C. | x | △ | ◎ | ◎ | ◎ | ◎ | ◎ | ◎ | ◎ |
| | 100° C. | x | △ | ○ | ◎ | ◎ | ◎ | ◎ | ◎ | ◎ |
| | 120° C. | x | x | ○ | ○ | ○ | ○ | ○ | ○ | ○ |
| | Adhesiveness 80° C. | △ | △ | ◎ | ◎ | ◎ | ◎ | ◎ | △ | △ |
| | 100° C. | x | △ | ◎ | ◎ | ◎ | ◎ | ○ | △ | x |
| | 120° C. | x | △ | ○ | ○ | ○ | ○ | ○ | △ | x |
| | Melt viscosity Pa·s | 70 | 70 | 72 | 75 | 85 | 100 | 115 | 120 | 125 |
| | | ○ | ○ | ○ | ○ | ○ | ○ | △ | △ | △ |

| | | EX 7 | EX 8 | EX 9 | EX 10 | EX 11 | EX 12 | EX 13 | EX 14 | CE 15 |
|---|---|---|---|---|---|---|---|---|---|---|
| Components of composition (parts by mass) | Butyl rubber | 100 | 50 | 50 | 50 | 50 | 50 | 50 | 50 | 50 |
| | EPDN | | 50 | 50 | 50 | 50 | 50 | 50 | 50 | 50 |
| | SEBS | 40 | 10 | 60 | 40 | 40 | 40 | 40 | 40 | 40 |
| | APP | 80 | 80 | 80 | 35 | 140 | 80 | 80 | 80 | 80 |
| | Petroleum resin | 150 | 150 | 150 | 150 | 150 | 52.5 | 210 | 150 | 150 |
| | Hydrogenated petroleum resin | | | | | | | | | |
| | Terpene resin | | | | | | | | 50 | |
| | Hydrogenated terpene resin | | | | | | | | | 50 |
| | Modified terpene resin | 50 | 50 | 50 | 50 | 50 | 17.5 | 70 | | |
| | Polybutene | 60 | 60 | 60 | 60 | 60 | 60 | 60 | 60 | 60 |
| | Silica | 10 | 10 | 10 | 10 | 10 | 10 | 10 | 10 | 10 |
| | Antioxidant | 1 | 1 | 1 | 1 | 1 | 1 | 1 | 1 | 1 |
| | Calcium oxide | 24.5 | 24.5 | 24.5 | 24.5 | 24.5 | 24.5 | 24.5 | 24.5 | 24.5 |
| | (Total) | 515.5 | 485.5 | 535.5 | 470.5 | 575.5 | 385.5 | 595.5 | 515.5 | 515.5 |
| Composition ratio | Calcium oxide/Adhesive composition | 5.0 | 5.3 | 4.8 | 5.5 | 4.4 | 6.8 | 4.3 | 5.0 | 5.0 |
| Evaluated results | Foaming property 80° C. | ◎ | ◎ | ◎ | ◎ | ◎ | ◎ | ◎ | ◎ | ◎ |
| | 100° C. | ◎ | ◎ | ◎ | ◎ | ◎ | ○ | ◎ | ○ | ○ |
| | 120° C. | ○ | ○ | ○ | ○ | ○ | ○ | ○ | ○ | ○ |
| | Adhesiveness 80° C. | ◎ | ◎ | △ | △ | △ | △ | ○ | ◎ | ◎ |
| | 100° C. | ○ | ◎ | △ | △ | △ | △ | ○ | ○ | ○ |
| | 120° C. | ○ | △ | △ | △ | △ | △ | △ | ○ | ○ |
| | Melt viscosity Pa·s | 77 | 73 | 94 | 98 | 68 | 140 | 72 | 80 | 90 |
| | | ○ | ○ | ○ | ○ | ○ | △ | △ | △ | △ |

| | | EX 16 | EX 17 | EX 18 |
|---|---|---|---|---|
| Components of composition (parts by mass) | Butyl rubber | 50 | 50 | 50 |
| | EPDN | 50 | 50 | 50 |
| | SEBS | 40 | 40 | 40 |
| | APP | 80 | 80 | 80 |
| | Petroleum resin | | 190 | 100 |
| | Hydrogenated petroleum resin | 150 | | |
| | Terpene resin | | | |
| | Hydrogenated terpene resin | | | |
| | Modified terpene resin | 50 | 10 | 100 |
| | Polybutene | 60 | 60 | 60 |
| | Silica | 10 | 10 | 10 |
| | Antioxidant | 1 | 1 | 1 |
| | Calcium oxide | 24.5 | 24.5 | 24.5 |
| | (Total) | 515.5 | 515.5 | 515.5 |
| Composition ratio | Calcium oxide/Adhesive composition | 5.0 | 5.0 | 5.0 |
| Evaluated results | Foaming property 80° C. | ◎ | ◎ | ◎ |
| | 100° C. | ○ | ○ | ◎ |

TABLE 1-continued

|  |  | | | |
|---|---|---|---|---|
| Adhesiveness | 120° C. | ▲ | ○ | ○ |
|  | 80° C. | ⊚ | ⊚ | ○ |
|  | 100° C. | ○ | ○ | ○ |
|  | 120° C. | ○ | ○ | ▲ |
| Melt viscosity Pa · s |  | 78 ○ | 87 ○ | 80 ○ |

According to the present invention, a hot melt adhesive composition can be provided in which foams are not remained at the interface between a polycarbonate resin or an acrylic resin and the hot melt adhesive composition and thus adhesive force or sealing force of the adhesive composition is not lowered even at a temperature equal to or higher than 80° C. Therefore, adhesive force or sealing force is not lowered for a long period in a product that is made of a polycarbonate resin or an acrylic resin by using the hot melt adhesive composition of the invention. Further, the cost of equipment can be saved and thus an operative efficiency can be improved, since previous heating and degasification of the polycarbonate resin or the acrylate resin is not necessary.

What is claimed is:

1. A hot melt adhesive composition wherein 2–30 parts by mass of calcium oxide is blended with 100 parts by mass of a hot melt adhesive composition containing rubber, amorphous polyolefin and a resinous tackifier.

2. A hot melt adhesive composition according to claim 1, wherein butyl rubber and the styrene-diene type block copolymer are contained as rubber components.

3. A hot melt adhesive composition according to claim 2, wherein a mass ratio of a styrene-diene type block copolymer in the rubber components is 5–40%.

4. A hot melt adhesive composition according to any one of claims 1–3, wherein 25–100 parts by mass of amorphous polyolefin is blended with 100 parts by mass of rubber.

5. A hot melt adhesive composition according to any one of claims 1–3, wherein 50–200 parts by mass of the resinous tackifier is blended with 100 parts by mass of rubber.

6. A hot melt adhesive composition according to claim 4, wherein 50–200 parts by mass of the resinous tackifier is blended with 100 parts by mass of rubber.

7. A hot melt adhesive composition according to claim 5 wherein a resinous tackifier is at least one kind of resin selected from the group consisting of petroleum resins, terpene resins, modified products of these resins and hydrogenates of these resins.

8. A hot melt adhesive composition according to any one of claims 1–3, wherein the composition is used for bonding with a polycarbonate resin or an acrylic resin.

9. A hot melt adhesive composition according to claim 4 wherein the composition is used for bonding with a polycarbonate resin or an acrylic resin.

10. A hot melt adhesive composition according to claim 8 wherein the composition is used for sealing between a lens of an automobile lamp made of a polycarbonate resin or an acrylic resin and a housing thereof.

11. An automobile lamp wherein sealing is made between a lens made of a polycarbonate resin or an acrylic resin and a housing by using a hot melt adhesive composition according to any one of claims 1–3.

12. An automobile lamp wherein sealing is made between a lens made of a polycarbonate resin or an acrylic resin and a housing by using a hot melt adhesive composition according to claim 4.

13. A hot melt adhesive composition according to claim 6, wherein a resinous tackifier is at least one kind of resin selected from the group consisting of petroleum resins, terpene resins, modified products of these resins, terpene resins, modified products of these resins and hydrogenates of these resins.

14. A hot melt adhesive composition according to claim 5, wherein the composition is used for bonding with a polycarbonate resin or an acrylic resin.

* * * * *

UNITED STATES PATENT AND TRADEMARK OFFICE
CERTIFICATE OF CORRECTION

PATENT NO.      : 6,340,236 B1
DATED           : January 22, 2002
INVENTOR(S)     : Takashi Hisanaga It is certified that error appears in the above-identified patent and that said Letters Patent is hereby corrected as shown below:

Column 10,
Lines 39 and 40, "terpene resins, modified products of these resins" (second occurrence) should be deleted.

Signed and Sealed this

Thirty-first Day of December, 2002

JAMES E. ROGAN
*Director of the United States Patent and Trademark Office*